(12) United States Patent
Widegren et al.

(10) Patent No.: US 9,750,007 B2
(45) Date of Patent: *Aug. 29, 2017

(54) HANDLING IDENTIFIERS FOR ENHANCED DEDICATED CHANNELS IN CELL FORWARD ACCESS CHANNEL STATES

(71) Applicant: Telefonaktiebolaget L M Ericsson (publ), Stockholm (SE)

(72) Inventors: Ina Widegren, Stockholm (SE); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

This patent is subject to a terminal disclaimer.

(21) Appl. No.: 14/851,902

(22) Filed: Sep. 11, 2015

(65) Prior Publication Data

US 2015/0382332 A1 Dec. 31, 2015

Related U.S. Application Data

(63) Continuation of application No. 14/569,052, filed on Dec. 12, 2014, now Pat. No. 9,148,899, which is a (Continued)

(51) Int. Cl.
*H04W 72/04* (2009.01)
*H04W 8/26* (2009.01)
(Continued)

(52) U.S. Cl.
CPC ......... *H04W 72/042* (2013.01); *H04W 8/26* (2013.01); *H04W 72/0406* (2013.01); *H04W 76/021* (2013.01); *H04W 88/12* (2013.01)

(58) Field of Classification Search
CPC ... H04W 72/042; H04W 28/04; H04W 72/04; H04W 24/00; H04W 36/0072; H04W 80/04; H04W 76/028
See application file for complete search history.

(56) References Cited

U.S. PATENT DOCUMENTS 6,898,429 B1   5/2005  Vialen et al.
8,929,903 B2   1/2015  Widegren et al.
(Continued)

FOREIGN PATENT DOCUMENTS

CN   1343433 A    4/2002
CN   101090364 A  12/2007
(Continued)

OTHER PUBLICATIONS

International Search Report, PCT/SE2009/050228, Jun. 17, 2009.
(Continued)

*Primary Examiner* — Andrew Lee
(74) *Attorney, Agent, or Firm* — Sage Patent Group

(57) ABSTRACT

A device receives information regarding allocation of an enhanced dedicated channel radio network temporary identifier (E-RNTI) to user equipment in a cell forward access channel (Cell_FACH) state, and receives information regarding a state change associated with the user equipment. The device determines that the E-RNTI can be released based on the state change, and provides, to another device, a request to release the E-RNTI in response to the state change and so that the E-RNTI can be used by other user equipment.

8 Claims, 10 Drawing Sheets

Related U.S. Application Data continuation of application No. 13/748,881, filed on Jan. 24, 2013, now Pat. No. 8,929,903, which is a continuation of application No. 12/934,053, filed as application No. PCT/SE2009/050228 on Mar. 5, 2009, now Pat. No. 8,380,214.

(60) Provisional application No. 61/048,464, filed on Apr. 28, 2008, provisional application No. 61/040,866, filed on Mar. 31, 2008.

(51) Int. Cl.
*H04W 76/02* (2009.01)
*H04W 88/12* (2009.01)

(56) References Cited

U.S. PATENT DOCUMENTS

| | | | | |
|---|---|---|---|---|
| 2006/0172739 | A1* | 8/2006 | Wigard | H04W 24/00 455/442 |
| 2006/0223532 | A1* | 10/2006 | Liu | H04W 8/02 455/436 |
| 2007/0049209 | A1 | 3/2007 | Usuda et al. | |
| 2008/0207216 | A1 | 8/2008 | Usuda et al. | |
| 2008/0261599 | A1* | 10/2008 | Mohanty | H04W 36/0055 455/436 |
| 2008/0305799 | A1* | 12/2008 | Zuniga | H04W 36/0072 455/437 |
| 2009/0041389 | A1* | 2/2009 | Kwon | H04L 1/0045 382/309 |
| 2009/0093280 | A1 | 4/2009 | Kitazoe | |
| 2009/0135769 | A1 | 5/2009 | Sambhwani et al. | |
| 2009/0135771 | A1* | 5/2009 | Pani | H04W 72/042 370/329 |
| 2009/0168728 | A1* | 7/2009 | Pani | H04W 8/26 370/332 |
| 2009/0196230 | A1* | 8/2009 | Kim | H04W 74/002 370/328 |
| 2009/0218637 | A1* | 9/2009 | Gomikawa | H01L 27/11526 257/402 |
| 2010/0041389 | A1* | 2/2010 | Cave | H04W 76/028 455/423 |
| 2013/0178221 | A1* | 7/2013 | Jung | H04L 9/0844 455/450 |

FOREIGN PATENT DOCUMENTS

| | | |
|---|---|---|
| EP | 2 259 619 A1 | 12/2010 |
| WO | WO 2007/023351 A2 | 3/2007 |
| WO | WO 2007/023351 A3 | 3/2007 |

OTHER PUBLICATIONS

International Preliminary Report on Patentability, PCT/2009/050228, Jun. 18, 2010.
English Translation of First Office Action, Chinese Patent Application No. 200980112084.5, Oct. 10, 2012.
Ericsson, "Handling of E-RNTI and H-RNTI for E-DCH in CELL-FACH", 3GPP Draft, R3-081386, 3$^{rd}$ Generation Partnership Project; vol. RAN WG3, XP050164558, May 5, 2008.
Ericsson, 3GPP TSG RAN WG3 Meeting #61, R3-082127, Handling of E-RNTI and H-RNTI at E-DCH for CELL-FACH and Idle, Jeju, Korea, Aug. 18-22, 2008, 7 pp.
Huawei, "Resource Release Indication for Enhanced Uplink in CELL-FACH State", 3GPP Draft, R1-080219, 3$^{rd}$ Generation Partnership Project; vol. RAN WG1, XP050108745, Jan. 14, 2008.
Nokia Siemens Networks et al., "Solution for Mapping between HS-DSCH RNTI and E-RNTI", 3GGP Draft, R3-080797, 3$^{rd}$ Generation Partnership Project; vol. RAN WG2, XP050139694, Mar. 31, 2008.
Nokia Siemens Networks et al., "On E-RNTI Allocation for UE with Enhanced UL in CELL_FACH", 3GPP Draft; R3-080796, 3$^{rd}$ Generation Partnership Project; vol. RAN WG3, XP050163998, Mar. 31, 2008.
Qualcomm Europe "E-DCH Resource Release in CELL-FACH" R3-080732, 3$^{rd}$ Generation Partnership Project; vol. RAN WG3, XP050163946, Mar. 31, 2008.
Office Action for Chinese Patent Application No. 201410542234.9 dated Jun. 20, 2017.

* cited by examiner

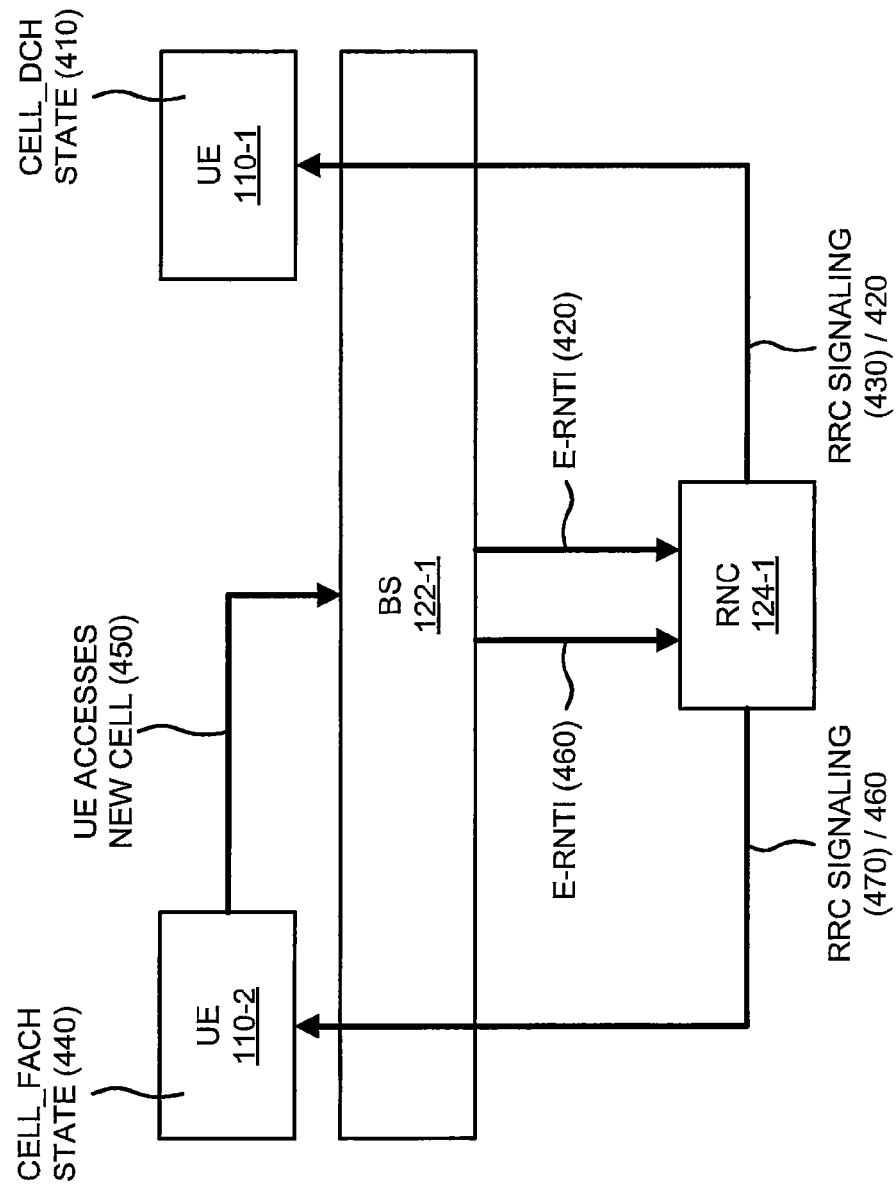

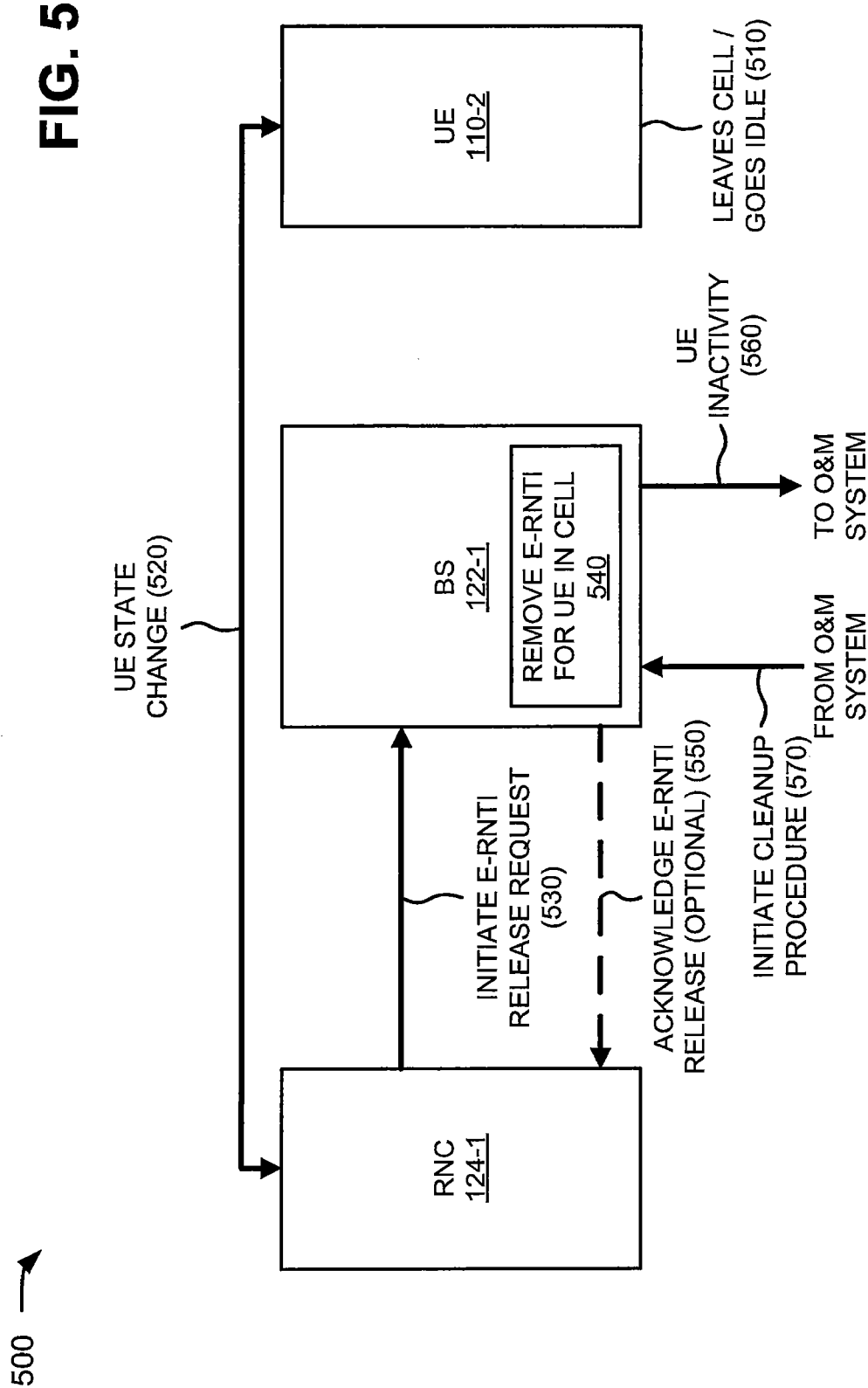

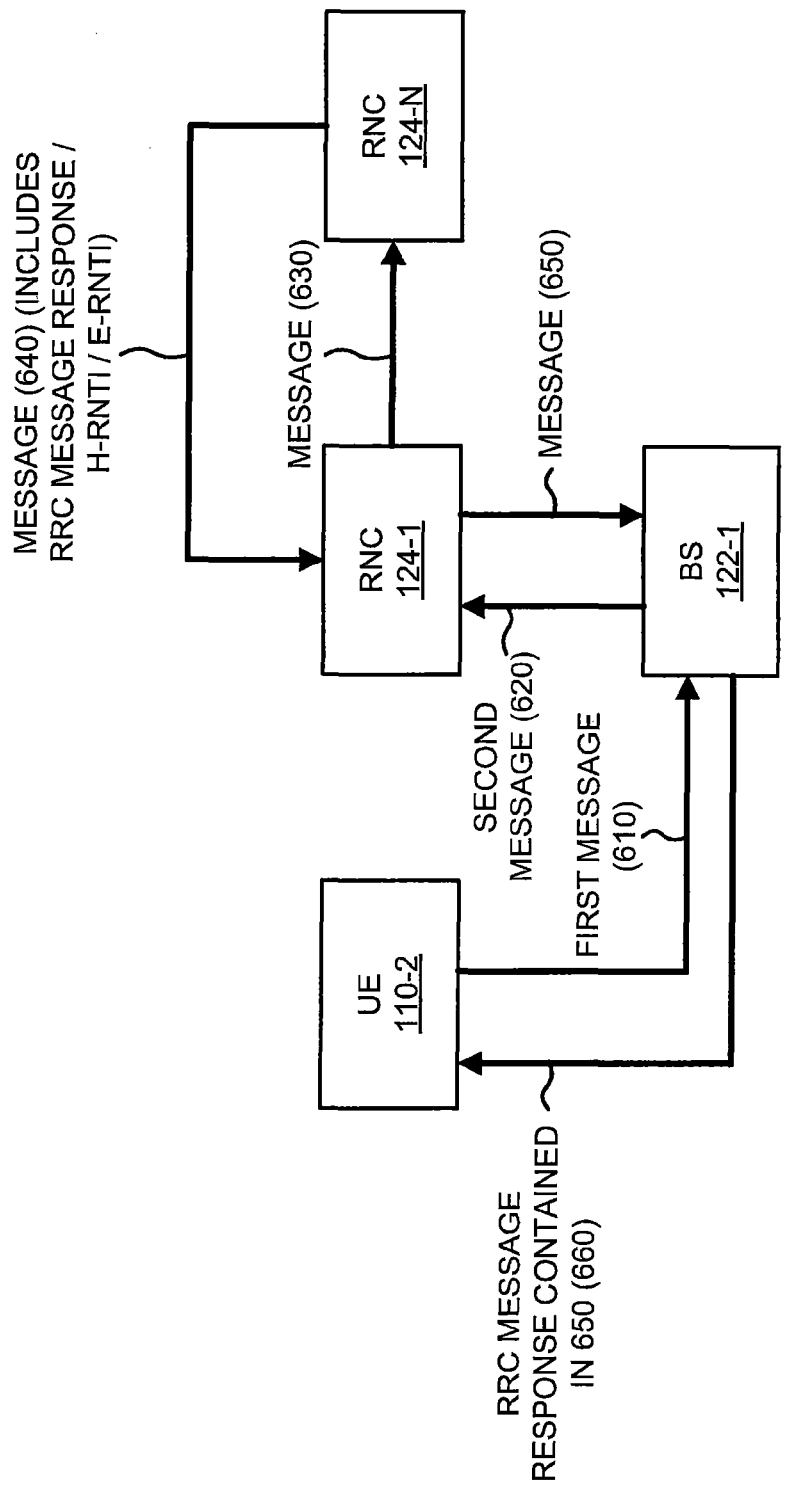

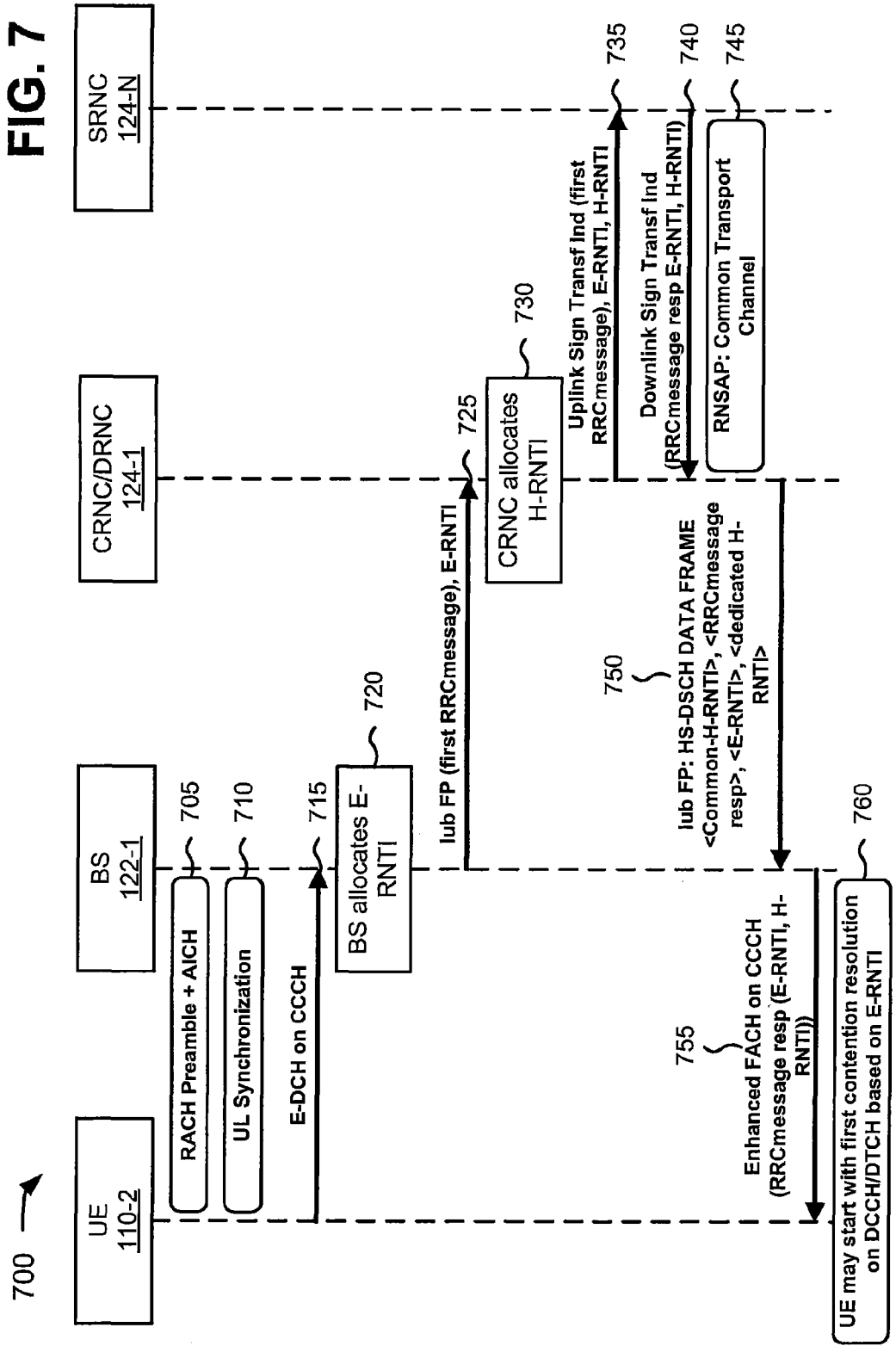

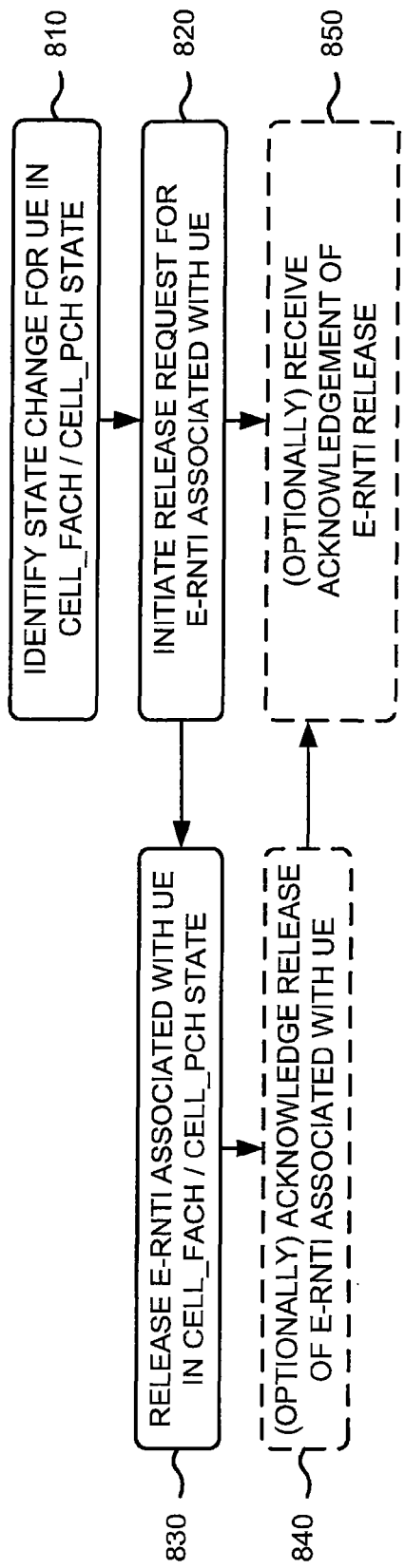

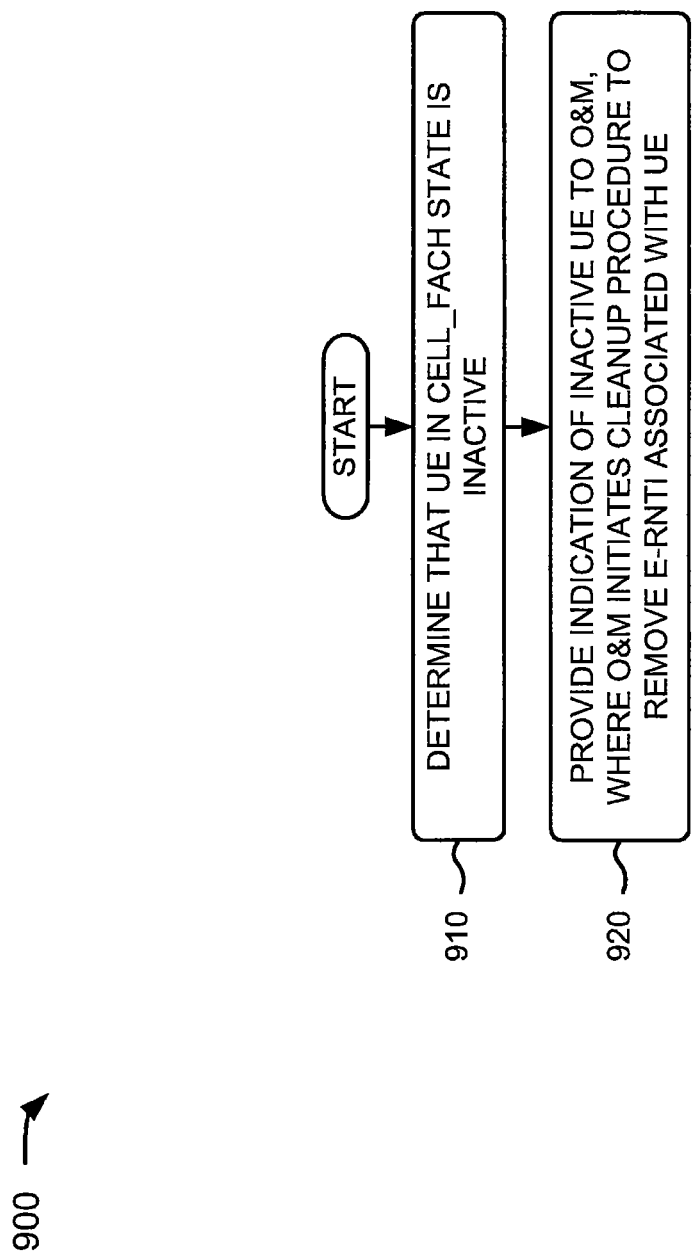

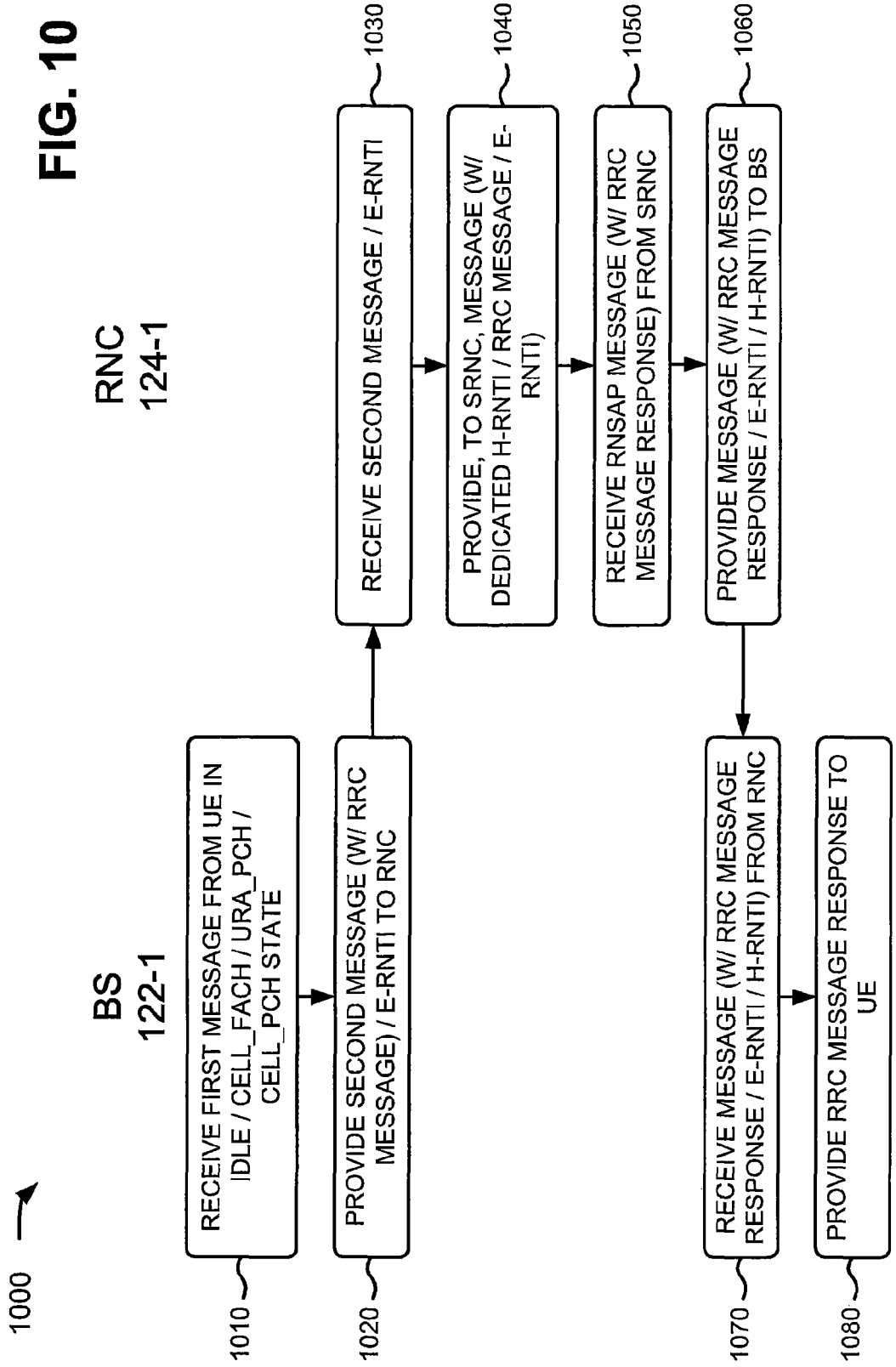

HANDLING IDENTIFIERS FOR ENHANCED DEDICATED CHANNELS IN CELL FORWARD ACCESS CHANNEL STATES

CROSS REFERENCE TO RELATED APPLICATIONS

This application is a continuation of U.S. patent application Ser. No. 14/569,052, filed Dec. 12, 2014, which itself is a continuation of U.S. patent application Ser. No. 13/748,881, filed Jan. 24, 2013, now U.S. Pat. No. 8,929,903, which itself is a continuation of U.S. patent application Ser. No. 12/934,053, filed Dec. 20, 2010, now U.S. Pat. No. 8,380,214, which itself is a 35 U.S.C. §371 national stage application of PCT International Application No. PCT/SE2009/050228, filed on 5 Mar. 2009, which itself claims priority to U.S. provisional patent Application Nos. 61/040,866, filed 31 Mar. 2008 and 61/048,464, filed 28 Apr. 2008, the disclosure and content of all of which are incorporated by reference herein in their entirety. The above-referenced PCT International Application was published in the English language as International Publication No. WO 2009/123544 A1 on 8 Oct. 2009.

TECHNICAL FIELD

Embodiments described herein relate generally to wireless communication systems, and more particularly, to handling of enhanced dedicated channel (E-DCH) radio network temporary identifiers (E-RNTIs) and high-speed downlink shared channel (HS-DSCH) RNTIs (H-RNTIs) for user equipment in a cell forward access channel (Cell_FACH) state.

BACKGROUND

An enhanced dedicated channel (E-DCH) is used as a transport channel for user equipment in a Cell_FACH state. The E-DCH is used for common control channel (CCCH), dedicated control channel (DCCH), and/or dedicated traffic channel (DTCH) transmissions. One CCCH message can be sent at multiple transmission timing intervals (TTIs) so that re-ordering is needed. On the E-DCH channel temporarily granted to particular user equipment, the data packets are set to the network. There are control channels in the downlink direction used to control the granting of resources to the user equipment. The user equipment recognizes which control messages that are relevant by the E-DCH Radio Network Temporary Identifier (E-RNTI). The E-RNTI is allocated by a base station (or Node B) when the user equipment establishes an E-DCH, and is unique within a cell carrying the E-DCH. The E-RNTI may be included in a media access control (MAC) header when the user equipment accesses the E-DCH common channel. An E-DCH absolute grant channel (AGCH) with the E-RNTI is used for contention resolution. No contention resolution is performed for CCCH.

The E-RNTI allocated to the user equipment has to be unique within the cell among all of the user equipment that are using the E-DCH (i.e., the user equipment that are in the Cell_FACH state and the user equipment that are in the Cell_DCH state).

For the enhanced Cell_FACH in the uplink, MAC-i and MAC-is are used to support the E-DCH transmission in the Cell_FACH state. One MAC-is entity per user equipment is located in the serving radio network controller (RNC) for handling DCCH/DTCH transmissions in the Cell_FACH state for the E-DCH. The MAC-is for CCCH is located in the controlling RNC.

For the downlink, Cell_FACH users may also use a high-speed packet access (HSPA) channel. User equipment in the Cell_FACH state receive data packets on a HS-DSCH instead of on the FACH. A HS-DSCH is a channel used in the high-speed downlink packet access (HSDPA) universal mobile telecommunications system (UMTS) that sends packets on a downlink to user equipment. With enhanced Cell_FACH in the downlink, users in a Cell_FACH state are allocated a HS-DSCH Radio Network Transaction Identifier (H-RNTI). An H-RNTI is allocated by a controlling RNC (CRNC) when the user equipment establish a HS-DSCH channel, and is unique within a cell carrying the HS-DSCH.

As described above, the E-RNTI is allocated by the base station whereas the H-RNTI is allocated by the controlling RNC. Even if allocation of E-RNTI in the base station has the advantage that the same node allocates the E-RNTI to users in both the Cell_FACH state and Cell_DCH state, and thus guarantee uniqueness of E-RNTI in the cell, such arrangements have several disadvantages. For example, such arrangements do not remove (or release) unused E-RNTIs allocated to Cell_FACH user equipment when required. Furthermore, as different nodes allocate the H-RNTI and the E-RNTI, the relation between a dedicated H-RNTI (e.g., used for enhanced FACH) and the E-RNTI is unknown to the nodes supporting the user equipment using the E-DCH in the Cell_FACH state. The base station needs to know this relation for discontinuous reception (DRX) and other radio channel handling purpose.

SUMMARY

It is an object of the invention to overcome at least some of the above disadvantages, to enable a base station to remove (or release) unused E-RNTIs, and to make the base station aware of a relation between uplink and downlink channels for user equipment in the Cell_FACH state.

Embodiments described herein may solve the problems of releasing an allocated E-RNTI when the E-RNTI is no longer used by user equipment, and removing the released E-RNTI from a base station. For example, a radio network controller (e.g., based on signaling with user equipment) may know when the E-RNTI can be removed from the base station, and may transmit a message (e.g., to the base station) providing an indication that the base station may remove the E-RNTI for use by other user equipment.

In an exemplary implementation of this embodiment, a device may include a memory to store a plurality of instructions, and a processing unit to execute instructions in the memory to receive information regarding allocation of an enhanced dedicated channel radio network temporary identifier (E-RNTI) to user equipment in a cell forward access channel (Cell_FACH) state. The processing unit may further execute instructions in the memory to receive information regarding a state change associated with the user equipment, determine that the E-RNTI can be released based on the state change, and provide, to another device, a request to release the E-RNTI in response to the state change and so that the E-RNTI can be used by other user equipment.

In another implementation of this embodiment, a method may be implemented in a wireless environment that may include a first device and a second device, where the first device receives information regarding cell access by user equipment in a cell forward access channel (Cell_FACH) state, and allocates an enhanced dedicated channel radio network temporary identifier (E-RNTI) for the user equipment in the Cell_FACH state when the information regarding cell access is received. The method may include receiving, by the second device, information regarding allocation of the E-RNTI to user equipment in the Cell_FACH state, and receiving, by the second device, state information regarding signaling between the user equipment and the second device. The method may also include providing, by the second device to the first device, a request to release the E-RNTI in response to the state information and so that the E-RNTI can be used by other user equipment.

Another embodiment described herein may solve the problem of a base station being unaware of a relation between uplink and downlink channels for user equipment in a Cell-FACH state. For example, a radio network controller may provide both an allocated E-RNTI and an allocated H-RNTI (e.g., that provides temporary identities related to uplink and downlink channels) as information elements of a message transmitted to a base station.

In an exemplary implementation of this embodiment, a system may include a base station to receive information regarding cell access by user equipment in a cell forward access channel (Cell_FACH) state, and allocate an enhanced dedicated channel radio network temporary identifier (E-RNTI) for the user equipment in the Cell_FACH state when the information regarding cell access is received. The system may further include a radio network controller (RNC) to receive, from the base station, a first message that includes the E-RNTI, generate a second message that includes a dedicated high speed downlink shared channel radio network transaction identifier (H-RNTI) and the E-RNTI, and provide the second message to the base station.

In another implementation of this embodiment, a device may include a memory to store a plurality of instructions, and a processing unit to execute instructions in the memory to receive information regarding cell access by user equipment in a cell forward access channel (Cell_FACH) state, and allocate an enhanced dedicated channel radio network temporary identifier (E-RNTI) for the user equipment in the Cell_FACH state when the information regarding cell access is received. The processing unit may further execute instructions in the memory to provide, to a radio network controller (RNC), a first message that includes the E-RNTI, and receive, from the radio network controller (RNC), a second message that includes a dedicated high speed downlink shared channel radio network transaction identifier (H-RNTI) and the E-RNTI.

Embodiments described herein, after providing unique allocation of an E-RNTI for user equipment in a cell, may remove (or release) unused E-RNTIs and may distribute the relation between a dedicated H-RNTI and the E-RNTI to a base station that is controlling user equipment using an E-DCH in a Cell_FACH state. Furthermore, embodiments described herein may provide, to a base station, a relation between uplink and downlink channels for user equipment in the Cell_FACH state so that base station is aware of the relation (e.g., for DRX and other radio channel handling purposes).

BRIEF DESCRIPTION OF THE DRAWINGS

FIG. 4 depicts a diagram of an exemplary E-RNTI allocation procedure capable of being performed by components of an exemplary portion of the network illustrated in FIG. 1;

FIG. 5 illustrates a diagram of an exemplary E-RNTI release procedure capable of being performed by components of an exemplary portion of the network depicted in FIG. 1;

FIGS. 6 and 7 depict diagrams of exemplary E-RNTI/H-RNTI messaging capable of being provided by components of exemplary portions of the network illustrated in FIG. 1;

FIG. 8 illustrates a flow chart of an exemplary process for releasing an E-RNTI according to embodiments described herein;

FIG. 9 depicts a flow chart of an exemplary process for removing an E-RNTI associated with inactive user equipment according to embodiments described herein; and FIG. 10 illustrates a flow chart of an exemplary process for providing E-RNTI/H-RNTI messaging according to embodiments described herein.

DETAILED DESCRIPTION

The following detailed description refers to the accompanying drawings. The same reference numbers in different drawings may identify the same or similar elements. Also, the following detailed description does not limit the invention.

Embodiments described herein may enable a base station to remove (or release) unused E-RNTIs, and may enable a base station to become aware of a relation between uplink and downlink channels for user equipment in the Cell_FACH state.

Figure 1:
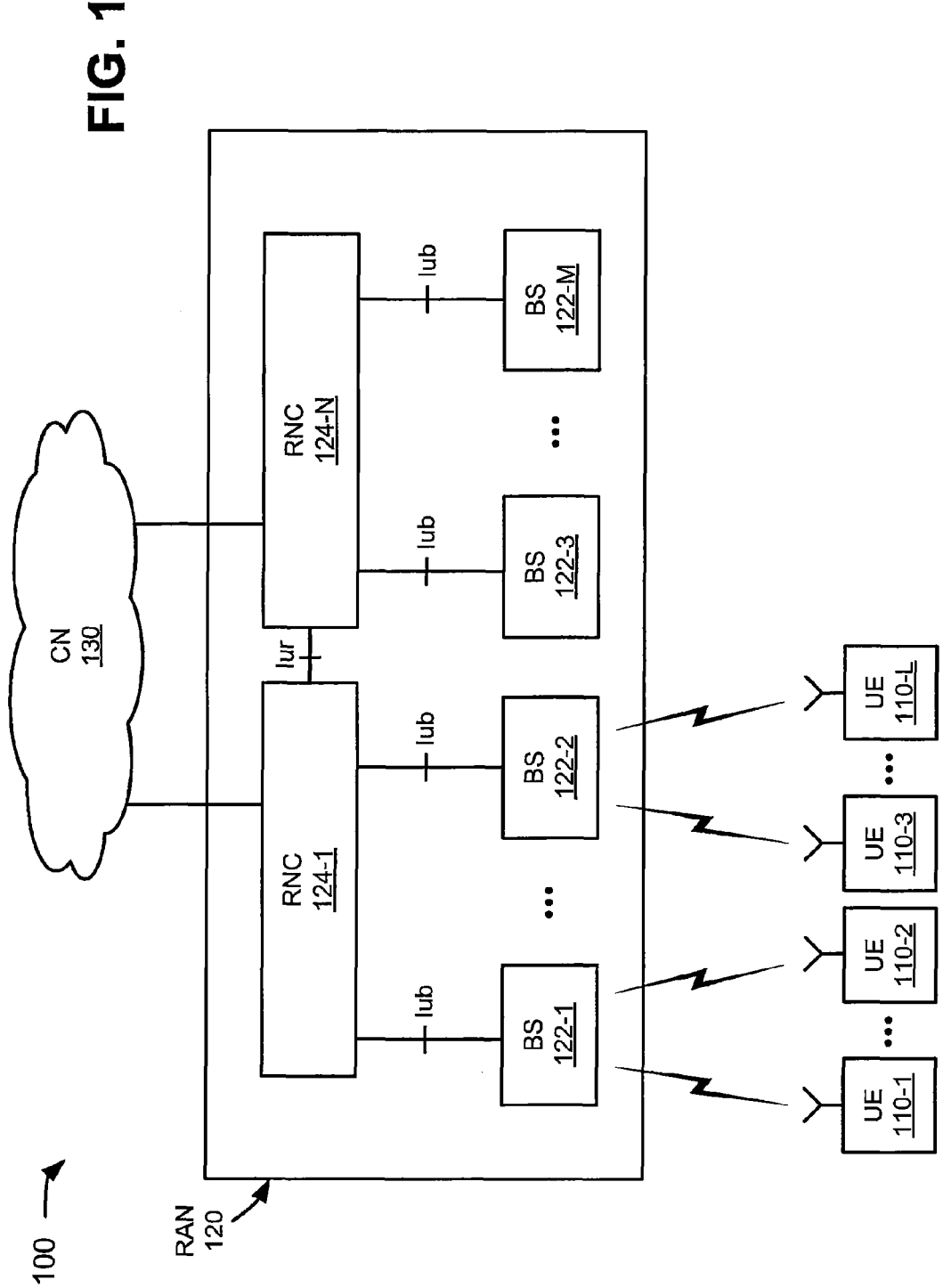
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively, and in some instances individually, as "user equipment 110"), a radio access network (RAN) 120, and a core network (CN) 130. Four pieces of user equipment 110, a single radio access network 120, and a single core network 130 have been illustrated in FIG. 1 for simplicity. In practice, there may be more UEs 110, random access networks 120, and/or core networks 130. Also, in some instances, a component in network 100 (e.g., one or more of user equipment 110, radio access network 120, and core network 130) may perform one or more functions described as being performed by another component or group of components in network 100.

User equipment 110 may include one or more devices capable of sending/receiving voice and/or data to/from radio access network 120. User equipment 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

Radio access network 120 may include one or more devices for transmitting voice and/or data to user equipment 110 and core network 130. As illustrated, radio access network 120 may include a group of base stations (BSs) 122-1 through 122-M (referred to collectively as "base stations 122" and in some instances, individually as "base station 122") and a group of radio network controllers (RNCs) 124-1 through 124-N (referred to collectively as "radio network controllers 124" and in some instances, individually as "radio network controller 124"). Four base stations 122 and two radio network controllers 124 are shown in FIG. 1 for simplicity. In practice, there may be more or fewer base stations 122 and/or radio network controllers 124. Also, in some instances, a component in radio access network 120 (e.g., one or more of base stations 122 and radio network controllers 124) may perform one or more functions described as being performed by another component or group of components in radio access network 120.

Base stations 122 (also referred to as "Node Bs") may include one or more devices that receive voice and/or data from radio network controllers 124 and transmit that voice and/or data to user equipment 110 via an air interface. Base stations 122 may also include one or more devices that receive voice and/or data from user equipment 110 over an air interface and transmit that voice and/or data to radio network controllers 124 or other user equipment 110.

In one embodiment, base station 122 may receive information regarding cell access by user equipment 110 in a Cell_FACH state, and may allocate an E-RNTI for user equipment 110 in the Cell_FACH state when the information regarding cell access is received. Base station 122 may provide, to radio network controller 124, a first message that includes the E-RNTI, and may receive, from radio network controller 124, a second message that includes an H-RNTI and the E-RNTI.

Radio network controllers 124 may include one or more devices that control and manage base stations 122. Radio network controllers 124 may also include devices that perform data processing to manage utilization of radio network services. Radio network controllers 124 may transmit/receive voice and data to/from base stations 122, other radio network controllers 124, and/or core network 130.

A radio network controller 124 may act as a controlling radio network controller (CRNC), a drift radio network controller (DRNC), or a serving radio network controller (SRNC). A CRNC may be responsible for controlling the resources of a base station 122. On the other hand, an SRNC may serve particular user equipment 110 and may manage connections towards that user equipment 110. Likewise, a DRNC may fulfill a similar role to the SRNC (e.g., may route traffic between a SRNC and particular user equipment 110).

As illustrated in FIG. 1, a radio network controller 124 may connect to a base station 122 via an Iub interface and to another radio network controller 124 via an Iur interface.

In one embodiment, radio network controller 124 may receive information regarding allocation of an E-RNTI to user equipment 110 in a Cell_FACH state, and may receive information regarding a state change associated with user equipment 110. Radio network controller 124 may determine that the E-RNTI can be released based on the state change, and may provide, to base station 122, a request to release the E-RNTI in response to the state change and so that the E-RNTI can be used by other user equipment 110.

Core network 130 may include one or more devices that transfer/receive voice and/or data to a circuit-switched and/or packet-switched network. In one embodiment, core network 130 may include, for example, a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Figure 2:
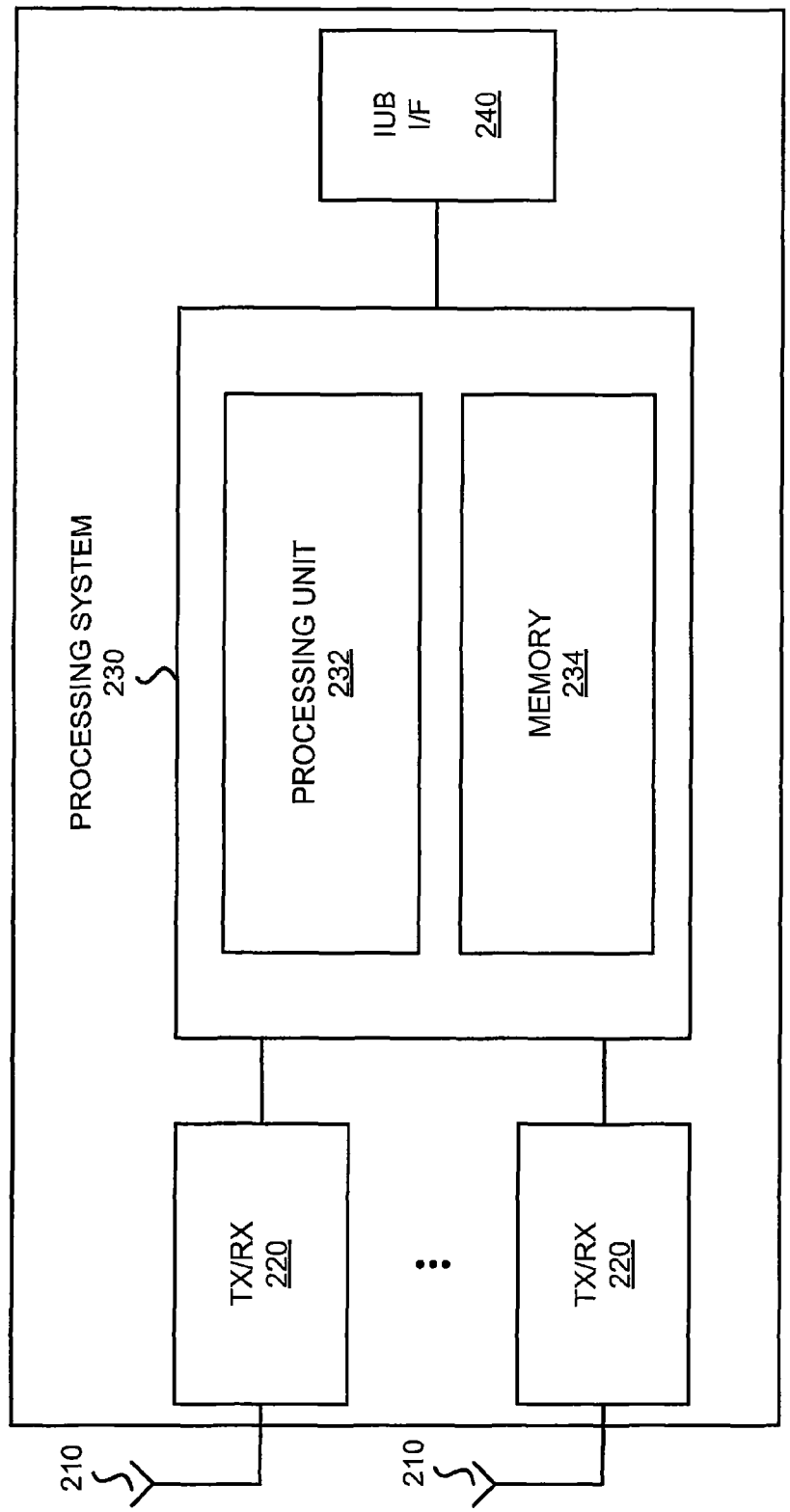
FIG. 2 illustrates a diagram of exemplary components of a base station depicted FIG. 1.

FIG. 2 illustrates a diagram of exemplary components of base station 122. As shown in FIG. 2, base station 122 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 122. Processing system 230 may also process information received via transceivers 220 and Iub interface 240. Processing system 230 may further measure quality and strength of connection, may determine the frame error rate (FER), and may transmit this information to radio network controller 124. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may generate control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 122 to transmit data to and receive data from radio network controller 124.

As described herein, base station 122 may perform certain operations in response to processing unit 232 executing software instructions of an application contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory may cause processing unit 232 to perform processes described herein. Alternatively, hard-wired circuitry may be used in place of or in combination with software instructions to implement processes described herein. Thus, embodiments described herein are not limited to any specific combination of hardware circuitry and software.

Although FIG. 2 shows exemplary components of base station 122, in other embodiments, base station 122 may contain fewer, different, differently arranged, or additional components than depicted in FIG. 2. In still other embodiments, one or more components of base station 122 may perform one or more other tasks described as being performed by one or more other components of base station 122.

Figure 3:
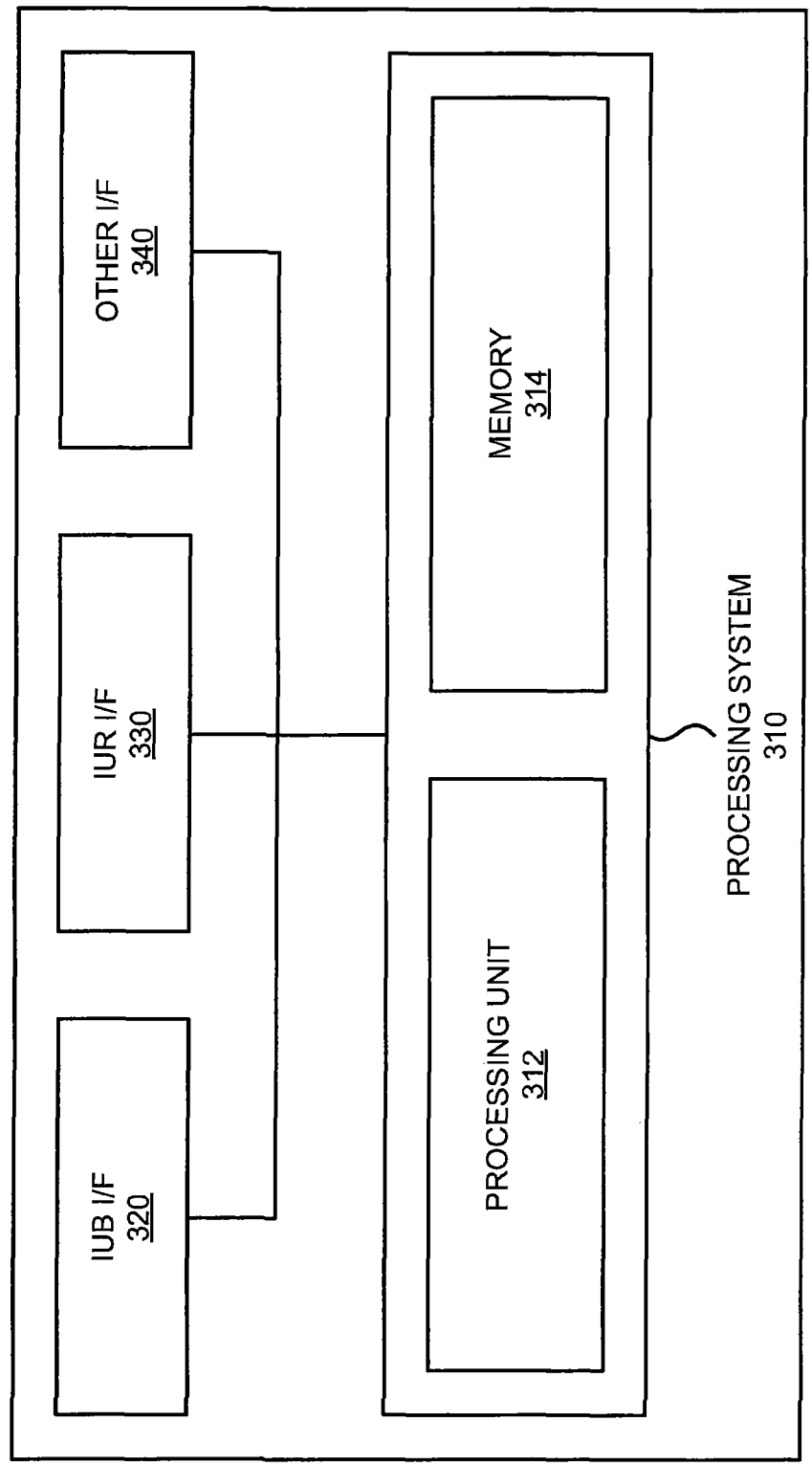
FIG. 3 depicts a diagram of exemplary components of a radio network controller illustrated in FIG. 1.

FIG. 3 depicts a diagram of exemplary components of radio network controller 124. As shown, radio network controller 124 may include a processing system 310, an Iub interface 320, an Iur interface 330, and/or other interfaces 340.

Processing system 310 may control the operation of radio network controller 124. As illustrated, processing system 310 may include a processing unit 312 and a memory 314. Processing unit 312 may handle protocol exchanges between Iub interface 320, Iur interface 330, and other interfaces 340. In addition, processing unit 312 may generate control messages and/or data messages and transmit those control messages and/or data messages via interfaces 320-340. Processing unit 312 may also process control messages and/or data messages received from interfaces 320-340. In one embodiment, processing unit 312 may include one or more processors, microprocessors, application specific integrated circuits (ASICs), field programmable gate arrays (FPGAs), or the like. Memory 314 may include a random access memory (RAM), a read-only memory (ROM), and/or another type of memory to store data and instructions that may be used by processing unit 212.

Iub interface 320 may include one or more line cards that allow radio network controller 124 to transmit control messages and/or data messages to and receive control messages and/or data messages from base station 122. Iur interface 330 may include one or more line cards that allow radio network controller 124 to transmit control messages and/or data messages to and receive control messages and/or data messages from another radio network controller. Other interfaces 340 may include interfaces to other devices and/or networks. For example, other interfaces 340 may include an Iucs interface, which is a core network interface to a circuit-switched voice network, and an Iups interface, which is a core network interface to a packet-switched data network.

As described herein, radio network controller 124 may perform certain operations in response to processing unit 312 executing software instructions of an application contained in a computer-readable medium, such as memory 314. The software instructions may be read into memory 314 from another computer-readable medium or from another device. The software instructions contained in memory may cause processing unit 312 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows exemplary components of radio network controller 124, in other embodiments, radio network controller 124 may contain fewer, different, differently arranged, or additional components than depicted in FIG. 3. In still other embodiments, one or more components of radio network controller 124 may perform one or more other tasks described as being performed by one or more other components of radio network controller 124.

FIG. 4 depicts a diagram of an exemplary E-RNTI allocation procedure capable of being performed by components of an exemplary portion 400 of network 100. As shown, exemplary network portion 400 may include user equipment 110-1, user equipment 110-2, base station 122-1, and RNC 124-1. User equipment 110-1 and 110-2 may include the features described above in connection with, for example, FIG. 1. Base station 122-1 may include the features described above in connection with, for example, FIGS. 1 and 2. RNC 124-1 may include the features described above in connection with, for example, FIGS. 1 and 3.

As further shown in FIG. 4, user equipment 110-1 may be in a Cell_DCH state 410, and base station 122-1 may allocate an E-RNTI 420 for user equipment 110-1 in Cell-DCH state 410. Base station 122-1 may inform (e.g., via node B application part (NBAP) and/or radio network subsystem application part (RNSAP) radio link dedicated signaling) RNC 124-1 about allocated E-RNTI 420. For example, base station 122-1 may inform RNC 124-1 about E-RNTI 420 in a response message associated with a dedicated radio link procedure that sets up this serving radio link. After base station 122-1 informs RNC 124-1 about E-RNTI 420, RNC 124-1 may inform user equipment 110-1 about E-RNTI 420, via radio resource control (RRC) signaling 430. Such a procedure may not be applicable when user equipment is in a Cell_FACH state since there may be no dedicated radio link-related signaling over Iub and Iur.

User equipment 110-2 may be in a Cell-FACH state 440 and E-RNTIs allocated for user equipment 110-1 and user equipment 110-2 may be unique within a cell. Thus, base station 122-1 may allocate the E-RNTIs regardless of a state associated with user equipment. For backwards compatibility purposes, base station 122-1 may allocate E-RNTIs for user equipment in the Cell_FACH state, such as user equipment 110-2. When user equipment 110-2 accesses a new cell on the CCCH for an E-DCH in the Cell_FACH state (e.g., via a cell update, a UTRAN Registration Area (URA) update, a RRC connection request, etc.), as indicated by reference number 450, base station 122-1 may allocate an E-RNTI 460 for user equipment 110-2. Base station 122-1 may inform RNC 124-1 about allocated E-RNTI 460. After base station 122-1 informs RNC 124-1 about E-RNTI 460, RNC 124-1 may inform user equipment 110-2 about E-RNTI 460, via RRC signaling 470 (e.g., in a RRC response message to a RRC initiating message).

RRC messages sent in the uplink on the CCCH may be transported in an Iub framing protocol to RNC 124-1 (e.g., a MAC-c termination point) and thereafter may be forwarded using a RNSAP uplink signaling transfer indication message. In one example, base station 122-1 may include E-RNTI 460 in an Iub frame of the Iub framing protocol when an uplink message on the CCCH for the E-DCH in the CELL_FACH state is received, and may include E-RNTI 460 in a new information element of the RNSAP uplink signaling transfer indication message. Instead of using the Iub framing protocol to inform RNC 124-1 about E-RNTI 460, base station 122-1 may invoke a new NBAP procedure and may send information about E-RNTI 460 to RNC 124-1 in the control plane. The NBAP procedure may include a binding to the frame sent in the user plane with a first RRC message.

Segmentation of the CCCH may be considered when defining the layout of the Iub frame (or frames) that carries the CCCH. Base station 122-1 may not differentiate a CCCH for an E-DCH in a Cell_FACH frame carrying a RRC cell update message from a frame carrying a RRC connection request. Therefore, E-RNTI 460 may need to be included in a first uplink Iub frame when the CCCH for the E-DCH in the Cell_FACH state is used, even if the radio network subsystem reconfigures idle user equipment to a Cell_DCH state when user equipment 110-2 requests an RRC connection. For backwards compatibility purposes, E-RNTI 460 may be included in a radio link setup response if RNC 124-1 decides to change a state of user equipment 110-2 to a Cell_DCH state and base station 122-1 receives a radio link setup request.

Although FIG. 4 shows exemplary components of network portion 400, in other embodiments, network portion 400 may contain fewer, different, differently arranged, or additional components than depicted in FIG. 4. In still other embodiments, one or more components of network portion 400 may perform one or more other tasks described as being performed by one or more other components of network portion 400.

FIG. 5 illustrates a diagram of an exemplary E-RNTI release procedure capable of being performed by components of an exemplary portion 500 of network 100. As shown, exemplary network portion 500 may include user equipment 110-2, base station 122-1, and RNC 124-1. User equipment 110-2 may include the features described above in connection with, for example, FIG. 1. Base station 122-1 may include the features described above in connection with, for example, FIGS. 1 and 2. RNC 124-1 may include the features described above in connection with, for example, FIGS. 1 and 3.

Base station 122-1 may not be aware of status changes associated with user equipment 110-2 since base station 122-1 may not terminate RRC signaling and may not be in contact with RNC 124-1 via RNSAP common transport channel procedures. For example, if user equipment 110-2 leaves a cell and/or goes idle, as indicated by reference number 510, base station 122-1 may not be aware that user equipment 110-2 leaves cell/goes idle 510. RNC 124-1 may be made aware of status changes (e.g., leaves cell/goes idle 510) associated with user equipment 110-2, via UE state change information 520. UE state change information 520 may include status information associated with user equipment 110-2.

An E-RNTI associated with user equipment 110-2 may need to be unique in a cell. If user equipment 110-2 is no longer in the Cell_FACH, URA_PCH, and/or Cell_PCH states, the E-RNTI associated with user equipment 110-2 may be unused (or "hanging") and may need to be released. RNC 124-1 may inform base station 122-1 of any status change for user equipment 110-2 that implies that an E-RNTI should be released. For example, if RNC 124-1 determines that the E-RNTI associated with user equipment 110-2 should be released, RNC 124-1 may initiate an E-RNTI release request 530, and may provide E-RNTI release request 530 to base station 122-1. If RNC 124-1 is a CRNC triggered by common transport channel procedures, RNC 124-1 may invoke a new common NBAP procedure or may send a new Iub framing protocol control frame to inform base station 122-1 that the E-RNTI associated with user equipment 110-2 should be released. If RNC 124-1 is a SRNC, RNC 124-1 may use new common procedures on RNSAP and/or NBAP to inform base station 122-1 that the E-RNTI associated with user equipment 110-2 should be released. For example, RNC 124-1 may implement a new common class "2" procedure on RNSAP, or may reuse an existing procedure (e.g., information exchange initiation/termination procedures or other suitable common procedures). An E-RNTI may be a hanging (e.g., not released) E-RNTI when base station 122-1 does not receive an acknowledgement that the E-RNTI associated with user equipment 110-2 should be released.

When base station 122-1 receives E-RNTI release request 530, base station 122-1 may remove the E-RNTI for user equipment 110-2 in the cell, as indicated by reference number 540, and may (optionally) provide an acknowledgement of the release of the E-RNTI to RNC 124-1, as indicated by reference number 550.

If RNC 124-1 utilizes the class "1" or class "2" procedure described above, a lost downlink NBAP class "2" message may provide an indication of a "hanging" E-RNTI. This may be solved with a periodic cleanup. For example, as shown in FIG. 5, if base station 122-1 determines that user equipment 110-2 has been inactive (e.g., longer than a time threshold and/or longer than another threshold defining a number of inactive user equipment in the cell), base station 122-1 may provide an indication 560 of user equipment 110-2 inactivity to an operations and maintenance (O&M) system. If user equipment 110-2 has been inactive for longer than one of the thresholds, the O&M system may initiate a cleanup procedure 570 via base station 122-1. Cleanup procedure 570 may instruct base station 122-1 to directly remove the E-RNTI associated with user equipment 110-2. In one example, the thresholds may take into consideration a situation where user equipment in the Cell_PCH state is inactive for a very long time (e.g., hours, days, or even longer).

As described above, base station 122-1 may be not aware of when user equipment leaves the cell, goes to idle mode, or no longer uses the E-RNTI. Since base station 122-1 informs RNC 124-1 about the E-RNTI for user equipment 110-2, RNC 124-1 knows to which user equipment an E-RNTI is allocated and thus which user equipment need to be monitored for status changes. In one embodiment, RNC 124-1, via NBAP, may send a user equipment status update to base station 122-1 when user equipment 110-2 (e.g., with an allocated E-RNTI) changes its state to idle mode, leaves the cell, or if RNC 124-1 decides that user equipment 110-2 may no longer use the E-DCH channel in Cell_FACH state.

Before RNC 124-1 requests base station 122-1 to remove an E-RNTI for user equipment 11-02, RNC 124-1 may inform user equipment 110-2 not to use the E-RNTI (e.g., via RRC signaling) RNC 124-1 may use the following procedure to inform base station 122-1 that user equipment 110-2 may no longer use an allocated E-RNTI for uplink transport on E-DCH in Cell_FACH state. RNC 124-1 may send a UE status update message to base station 122-1. Upon reception of the UE status update message, base station 122-1 may remove user equipment's 110-2 association with the E-RNTI, and may release the allocated E-RNTI. When the E-RNTI is released, base station 122-1 may respond with a UE status update response message to RNC 124-1. Table 1 illustrates an example of a UE status update message format in the NBAP protocol.

TABLE 1

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| Cell E-RNTI | | 1 . . . <maxCellinNodeB> | | | | |

TABLE 1-continued

| IE/Group Name | Presence | Range | IE Type and Reference | Semantics Description | Criticality | Assigned Criticality |
|---|---|---|---|---|---|---|
| Status Information | | | | | | |
| > C-ID | M | | 9.2.1.9 | | | |
| > Vacant E-RNTI | | 1 ... <maxErntiToRelease> | | | | |
| >> E-RNTI | M | | 9.2.1.75 | | | |

Although FIG. 5 shows exemplary components of network portion 500, in other embodiments, network portion 500 may contain fewer, different, differently arranged, or additional components than depicted in FIG. 5. In still other embodiments, one or more components of network portion 500 may perform one or more other tasks described as being performed by one or more other components of network portion 500.

FIG. 6 depicts a diagram of exemplary E-RNTI/H-RNTI messaging capable of being provided by components of an exemplary portion 600 of network 100. As shown, exemplary network portion 600 may include user equipment 110-2, base station 122-1, RNC 124-1, and RNC 124-N. User equipment 110-2 may include the features described above in connection with, for example, FIG. 1. Base station 122-1 may include the features described above in connection with, for example, FIGS. 1 and 2. RNC 124-1 and 124-N may include the features described above in connection with, for example, FIGS. 1 and 3. It may be assumed that RNC 124-1 is a CRNC and/or a DRNC, and that RNC 124-N is a SRNC.

There may be a need for base station 122-1 to know which dedicated H-RNTI is allocated to user equipment (e.g., user equipment 110-2) using the enhanced uplink in the Cell_FACH state. Base station 122-1 may need to know which dedicated H-RNTI is allocated to user equipment 110-2 before user equipment 110-2 attempts to access the E-DCH in the Cell_FACH state using the DTCH/DCCH and E-RNTI contention resolution.

As shown in FIG. 6, user equipment 110-2 may provide a first message 610 to base station 122-1 on the CCCH. First message 610 may include, for example, a RRC message. Base station 122-1 may forward the content of first message 610, in a second message 620 (e.g., an Iub frame), to RNC 124-1. Second message 620 may include an E-RNTI (e.g., E-RNTI 460 (FIG. 4)) allocated to user equipment 110-2 (e.g., when user equipment 110-2 accesses a new cell) and the RRC message contained in first message 610. When RNC 124-1 receives second message 620 (e.g., and the E-RNTI and the RRC message contained in first message 610), RNC 124-1 may provide, to RNC 124-N, a message 630 (e.g., that includes a dedicated H-RNTI allocated to user equipment 110-2), the E-RNTI, and the RRC message contained in first message 610. Message 630 may include a RNSAP uplink signaling transfer indication message (e.g., in case of Iur). RNC 124-N may provide, to RNC 124-1, a RNSAP message 640 (e.g., using RNSAP downlink signaling transfer indication) that includes a RRC message response, the dedicated H-RNTI, and the E-RNTI. RNC 124-1 may provide, to base station 122-1, a message 650 that includes the RRC message response in one field, the dedicated H-RNTI in another field, and the E-RNTI in still another field. Base station 122-1 may receive message 650, and may provide a RRC message response 660 (e.g., the RRC message response contained in message 650) to user equipment 110-2. RRC message response 660 may include the dedicated H-RNTI and the E-RNTI. When user equipment 110-2 receives RRC message response 660, user equipment 110-2 may attempt to access the E-DCH in the Cell_FACH state using the DTCH/DCCH and E-RNTI contention resolution.

However, before the E-RNTI is allocated to user equipment 110-2, user equipment 110-2 may access the E-DCH in the Cell_FACH state using the CCCH. FIG. 7 depicts when and where the E-RNTI and the dedicated H-RNTI are allocated in such a situation. FIG. 7 depicts a diagram of exemplary E-RNTI/H-RNTI messaging capable of being provided by components of an exemplary portion 700 of network 100. As shown, exemplary network portion 700 may include user equipment 110-2, base station 122-1, RNC 124-1, and RNC 124-N. User equipment 110-2 may include the features described above in connection with, for example, FIG. 1. Base station 122-1 may include the features described above in connection with, for example, FIGS. 1 and 2. RNC 124-1 and 124-N may include the features described above in connection with, for example, FIGS. 1 and 3. It may be assumed that RNC 124-1 is a CRNC and/or a DRNC, and that RNC 124-N is a SRNC.

As further shown in FIG. 7, a random access channel (RACH) (e.g., an uplink transport channel) procedure 705 may be conducted between user equipment 110-2 and base station 122-1. In one example, RACH procedure 705 may include user equipment 110-2 decoding a broadcast control channel (BCH) (e.g., to determine available RACH sub-channels, scrambling codes, and signatures), and selecting one of the RACH sub-channels and one of the signatures. User equipment 110-2 may measure a downlink power level, may set an initial RACH power level, may send a RACH preamble to base station 122-1, and may decode the acquisition indicator channel (AICH) to determine whether base station 122-1 detected the RACH preamble. If no AICH transmission is detected, user equipment 110-2 may increase the RACH preamble transmission power, and may retransmit the RACH preamble to base station 122-1. When an AICH transmission is detected from base station 122-1, user equipment 110-2 may transmit a message part of the RACH transmission.

An uplink synchronization procedure 710 may be conducted between user equipment 110-2 and base station 122-1. Uplink synchronization procedure 710 may include base station 122-1 monitoring signals from user equipment 110-2, and making timing adjustments in the transmission based on the monitored signals.

As further shown in FIG. 7, if user equipment 110-2 attempts to access the E-DCH on the CCCH, as indicated by reference number 715, base station 122-1 may allocate an E-RNTI for user equipment 110-2, as indicated by reference number 720. After allocating the E-RNTI for user equipment 110-2, base station 122-1 may provide a first message 725 (that includes a first RRC message received from user equipment 110-2), via the Iub framing protocol (FP), to RNC 124-1. First message 725 may include the E-RNTI allocated to user equipment 110-2. When RNC 124-1 receives first message 725 (e.g., the first RRC message and the E-RNTI), RNC 124-1 may allocate a dedicated H-RNTI for user equipment 110-2, as indicated by reference number 730, and may provide an uplink signaling transfer indication message 735 to RNC 124-N. Uplink signaling transfer indication message 735 may include the first RRC message, the allocated E-RNTI, and the dedicated H-RNTI.

RNC 124-N may receive uplink signaling transfer indication message 735, and may provide a downlink signaling transfer indication message 740 to RNC 124-1. Downlink signaling transfer indication message 740 may include a RRC message response, the allocated E-RNTI, and the dedicated H-RNTI. In one embodiment, messages 735 and 740 may be provided between RNC 124-1 and RNC 124-N via a RNSAP common transport channel 745. RNC 124-1 may receive downlink signaling transfer indication message 740, and may provide a message 750 (e.g., "HS-DSCH DATA FRAME <Common-H-RNTI>, <RRCmessage resp>, <E-RNTI>, <dedicated H-RNTI>") to base station 122-1, via the Iub framing protocol (FP). As shown, message 750 may include the RRC message response, the allocated E-RNTI, the dedicated H-RNTI, and other information. Base station 122-1 may receive message 750, and may provide a message 755 (e.g., that includes the RRC message response, the allocated E-RNTI, and the dedicated H-RNTI) to user equipment 110-2, via enhanced FACH on the CCCH. User equipment 110-2 may receive message 755, and may start a first contention resolution on the DCCH/DTCH based on the allocated E-RNTI, as indicated by reference number 760.

If the dedicated H-RNTI is sent in a procedure that is independent of the downlink RRC message response, a race condition may occur between reception of the dedicated H-RNTI in base station 122-1 via this independent procedure and reception of the RRC response message by user equipment 110-2. With an independent procedure there may be a risk that base station 122-1 has not received the relation between the allocated E-RNTI and the dedicated H-RNTI at the start of the first contention resolution (e.g., by user equipment 110-2). A consequence of this may include disturbance in a discontinuous reception (DRX) procedure that results in a lost frame.

However, such a race condition may be avoided. For example, it may be assumed that a NBAP (or Iub) framing protocol control message is the independent procedure that may generate a race condition. If a header of the Iub frame carrying the RRC message response is used, the race condition may be avoided. The H-RNTI (e.g., a common H-RNTI) to be used over the downlink may be included in message 750 (e.g., the HS-DSCH DATA FRAME TYPE 2 message). If the dedicated H-RNTI and the allocated E-RNTI are included in message 750 (e.g., in spare extensions of message 750), base station 122-1 may associate the allocated E-RNTI with the dedicated H-RNTI. Thus, the dedicated H-RNTI may be carried both in RRC messages (e.g., as a payload of the framing protocol frame) and in a frame protocol header. The allocated E-RNTI and the dedicated H-RNTI may be included if user equipment 110-2 will be in a Cell_FACH, URA_PCH, and/or Cell_PCH states after completion of the RRC procedure. In other words, if the downlink RRC message reconfigures user equipment 110-2 to the Cell_DCH, then the allocated E-RNTI and the dedicated H-RNTI may not be included.

In one embodiment, the NBAP class "2" procedure described above in connection with FIG. 5 may be used to inform base station 122-1 about the allocated H-RNTI. Depending on the selected method for DRX and other Layer 2 handling of the E-DCH in the Cell_FACH state, lack of awareness of the dedicated H-RNTI in base station 122-1, at the first contention resolution (e.g., based on the E-RNTI) may be acceptable. If so, the NBAP class "2" procedure may be selected.

If RNC 124-1 changes the dedicated H-RNTI to a new H-RNTI, the new dedicated H-RNTI may be associated with a downlink RRC message that informs user equipment 110-2 about the new dedicated H-RNTI. RNC 124-1 may include new information elements (e.g., the E-RNTI and the new dedicated H-RNTI) in a header of the Iub frame and base station 122-1 may check the Iub frame header when user equipment 110-2 is using the DTCH/DCCH. In another embodiment, when RNC 124-1 changes the dedicated H-RNTI, base station 122-1 may be informed about the new dedicated H-RNTI using, for example, a NBAP message UE status indication message.

RNC 124-1 may send information to base station 122-1 about which dedicated H-RNTI is allocated to user equipment 110-2, and user equipment 110-2 may be identified by the E-RNTI. Either NBAP or Iub framing protocol may be used depending on the selected method for DRX and other Layer 2 handling of the E-DCH in the Cell_FACH state. For example, a downlink Iub frame may carry a RRC message that sends a new or changed dedicated H-RNTI to user equipment in the Cell_FACH, URA_PCH, and/or Cell_PCH states, with enhanced RACH. The Iub frame protocol header may include the new dedicated H-RNTI as well as the E-RNTI allocated to the user equipment. In another example, an NBAP class "2" procedure may be used to signal the new dedicated H-RNTI as well as the E-RNTI allocated to user equipment 110-2. Alternatively and/or additionally, a NBAP class "1" procedure may be used to inform base station 122-1 about the allocated H-RNTI. An acknowledgement may be sent from base station 122-1 to RNC 124-1. Therefore, RNC 124-1 can supervise the reception of the new dedicated H-RNTI, and the risk of lost NBAP messages may be eliminated.

Although FIGS. 6 and 7 show exemplary components of network portions 600 and 700, in other embodiments, network portions 600 and 700 may contain fewer, different, differently arranged, or additional components than depicted in FIGS. 6 and 7. In still other embodiments, one or more components of network portions 600 and 700 may perform one or more other tasks described as being performed by one or more other components of network portions 600 and 700.

FIG. 8 depicts a flow chart of an exemplary process 800 for releasing an E-RNTI according to embodiments described herein. In one embodiment, process 800 may be performed by base station 122-1 and RNC 124-1. In other embodiments, some or all of process 800 may be performed by base station 122-1 and RNC 124-1 in combination with another device or group of devices (e.g., communicating with base station 122-1 and RNC 124-1).

As illustrated in FIG. 8, process 800 may include identifying, via RNC 124-1, a state change for user equipment in the Cell_FACH or Cell_PCH state (block 810), and initiating, via RNC 124-1, a release request for an E-RNTI associated with the user equipment (block 820). For example, in embodiments described above in connection with FIG. 5, RNC 124-1 may be made aware of status changes (e.g., leaves cell/goes idle 510) associated with user equipment 110-2, via UE state change information 520. RNC 124-1 may inform base station 122-1 of any status change for user equipment 110-2 that implies that an E-RNTI should be released. In one example, if RNC 124-1 determines that the E-RNTI associated with user equipment 110-2 should be released, RNC 124-1 may initiate an E-RNTI release request 530, and may provide E-RNTI release request 530 to base station 122-1.

Returning to FIG. 8, base station 122-1 may release the E-RNTI associated with the user equipment in the Cell_FACH or Cell_PCH state (block 830), base station 122-1 may (optionally) acknowledge release of the E-RNTI associated with the user equipment (block 840), and RNC 124-1 may (optionally) receive acknowledgement of the E-RNTI release (block 850). For example, in embodiments described above in connection with FIG. 5, when base station 122-1 receives E-RNTI release request 530, base station 122-1 may remove the E-RNTI for user equipment 110-2 in the cell, as indicated by reference number 540, and may (optionally) provide an acknowledgement of the release of the E-RNTI to RNC 124-1, as indicated by reference number 550.

FIG. 9 illustrates a flow chart of an exemplary process 900 for removing an E-RNTI associated with inactive user equipment according to embodiments described herein. In one embodiment, process 900 may be performed by base station 122-1. In other embodiments, some or all of process 900 may be performed by base station 122-1 in combination with another device or group of devices (e.g., communicating with base station 122-1).

As illustrated in FIG. 9, process 900 may include determining that user equipment in a Cell-FACH state is inactive (block 910), and providing an indication of the inactive user equipment to an operations and maintenance (O&M) system, where the O&M system initiates a cleanup procedure to remove the E-RNTI associated with the inactive user equipment (block 920). For example, in embodiments described above in connection with FIG. 5, if base station 122-1 determines that user equipment 110-2 has been inactive (e.g., longer than a time threshold and/or longer than another threshold defining a number of inactive user equipments in the cell), base station 122-1 may provide indication 560 of user equipment 110-2 inactivity to an operations and maintenance (O&M) system. If user equipment 110-2 has been inactive for longer than one of the thresholds, the O&M system may initiate cleanup procedure 570 via base station 122-1. Cleanup procedure 570 may instruct base station 122-1 to directly remove the E-RNTI associated with user equipment 110-2.

FIG. 10 depicts a flow chart of an exemplary process 1000 for providing E-RNTI/H-RNTI messaging according to embodiments described herein. In one embodiment, process 1000 may be performed by base station 122-1 and RNC 124-1. In other embodiments, some or all of process 1000 may be performed by base station 122-1 and RNC 124-1 in combination with another device or group of devices (e.g., communicating with base station 122-1 and RNC 124-1).

As illustrated in FIG. 10, process 1000 may include receiving, via base station 122-1, a first message from user equipment in an idle, Cell-FACH, URA_PCH, and/or Cell_PCH state (block 1010), providing, via base station 122-1, a second message (that includes an E-RNTI and an RRC message received via the first message) to RNC 124-1 (block 1020), and receiving, via RNC 124-1, the second RRC message (block 1030). For example, in embodiments described above in connection with FIG. 6, user equipment 110-2 may provide first message 610 to base station 122-1 on the CCCH. First message 610 may include, for example, a RRC message. Base station 122-1 may forward the content of first message 610, in second message 620 (e.g., an Iub frame), to RNC 124-1. Second message 620 may include an E-RNTI (e.g., E-RNTI 460 (FIG. 4)) allocated to user equipment 110-2 (e.g., when user equipment 110-2 accesses a new cell) and the RRC message contained in first message 610.

Returning to FIG. 10, RNC 124-1 may provide, to a SRNC, a message (that includes a dedicated H-RNTI for enhanced Cell_FACH, the E-RNTI, and the RRC message) (block 1040), may receive a RNSAP message (that includes a RRC message response, the E-RNTI, and the dedicated H-RNTI) from the SRNC (block 1050), and may provide a message (that includes the RRC message response, the E-RNTI, and the dedicated H-RNTI) to base station 122-1 (block 1060). For example, in embodiments described above in connection with FIG. 6, when RNC 124-1 receives second message 620 (e.g., and the E-RNTI and the RRC message contained in first message 610), RNC 124-1 may provide, to RNC 124-N, message 630 (e.g., that includes a dedicated H-RNTI allocated to user equipment 110-2), the E-RNTI, and the RRC message contained in first message 610. Message 630 may include a RNSAP uplink signaling transfer indication message (e.g., in case of Iur). RNC 124-N may provide, to RNC 124-1, RNSAP message 640 (e.g., using RNSAP downlink signaling transfer indication) that includes a RRC message response, the dedicated H-RNTI, and the E-RNTI. RNC 124-1 may provide, to base station 122-1, message 650 that includes the RRC message response in one field, the dedicated H-RNTI in another field, and the E-RNTI in still another field.

As further shown in FIG. 10, base station 122-1 may receive the message (that includes the RRC message response, the E-RNTI, and the dedicated H-RNTI) from RNC 124-1 (block 1070), and may provide the RRC message response to the user equipment (block 1080). For example, in embodiments described above in connection with FIG. 6, base station 122-1 may receive message 650, and may provide RRC message response 660 (e.g., the RRC message response contained in message 650) to user equipment 110-2. RRC message response 660 may include the dedicated H-RNTI and the E-RNTI. When user equipment 110-2 receives RRC message response 660, user equipment 110-2 may attempt to access the E-DCH in the Cell_FACH state using the DTCH/DCCH and E-RNTI contention resolution.

Embodiments described herein may enable a base station to remove (or release) unused E-RNTIs, and may enable a base station to become aware of a relation between uplink and downlink channels for user equipment in the Cell_FACH state. Embodiments described herein, after providing unique allocation of an E-RNTI for user equipment in a cell, may remove (or release) unused E-RNTIs and may distribute the relation between a dedicated H-RNTI and the E-RNTI to a base station that is controlling user equipment using an E-DCH in a Cell_FACH state. Furthermore, embodiments described herein may provide, to a base station, a relation between uplink and downlink channels for user equipment in the Cell_FACH state so that base station is aware of the relation (e.g., for DRX and other radio channel handling purposes).

Embodiments described herein provide illustration and description, but are not intended to be exhaustive or to limit the implementations to the precise form disclosed. Modifications and variations are possible in light of the above teachings, or may be acquired from practice of the implementations. For example, while series of blocks have been described with regard to FIGS. 8-10, the order of the blocks may be modified in other embodiments. Further, non-dependent blocks may be performed in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A radio network controller (RNC) device comprising:
a processor that is configured to perform operations comprising:
receiving information regarding allocation of an enhanced dedicated channel radio network temporary identifier (E-RNTI) to user equipment in a cell forward access channel (Cell_FACH) state;
generating a message that includes a high speed downlink shared channel radio network transaction identifier (H-RNTI) and the E-RNTI; and
providing the message to a base station.

2. The RNC device of claim 1, where the H-RNTI is a peer of the E-RNTI.

3. A method performed in a radio network controller in a wireless environment, the radio network controller being connected to a base station, the method comprising:
receiving information regarding allocation of an enhanced dedicated channel radio network temporary identifier (E-RNTI) to user equipment in a cell forward access channel (Cell_FACH) state from the base station;
generating a message that includes a dedicated high speed downlink shared channel radio network transaction identifier (H-RNTI) and the E-RNTI; and
providing the message to the base station.

4. The method of claim 3, wherein the information regarding allocation of the E-RNTI to the user equipment in the Cell_FACH state is forwarded to the radio network controller by the base station in a second message.

5. The method of claim 3, further comprising:
providing the message to the base station using a Node B application part (NBAP) or an Iub data frame.

6. The method of claim 3, wherein the H-RNTI is a peer of the E-RNTI.

7. A base station comprising:
a processor that is configured to perform operations comprising:
receiving information regarding cell access by user equipment in a cell forward access channel (Cell_FACH) state;
allocating an enhanced dedicated channel radio network temporary identifier (E-RNTI) for the user equipment in the Cell_FACH state when the information regarding cell access is received;
providing to a radio network controller (RNC) a first message that includes the E-RNTI; and
receiving, from the RNC, a second message that includes a dedicated high speed downlink shared channel radio network transaction identifier (H-RNTI) and the E-RNTI.

8. The RNC device of claim 1, wherein the information regarding allocation of the E-RNTI to the user equipment in the Cell_FACH state is received at the RNC from the base station.

* * * * *

UNITED STATES PATENT AND TRADEMARK OFFICE
CERTIFICATE OF CORRECTION

PATENT NO. : 9,750,007 B2  
APPLICATION NO. : 14/851902  
DATED : August 29, 2017  
INVENTOR(S) : Widegren et al.

Page 1 of 1

It is certified that error appears in the above-identified patent and that said Letters Patent is hereby corrected as shown below:

In the Specification

In Column 10, Line 44, delete "signaling) RNC" and insert -- signaling). RNC --, therefor.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*